United States Patent
Haber

[11] Patent Number: 6,081,531
[45] Date of Patent: Jun. 27, 2000

[54] APPARATUS AND METHODS FOR USING CODING TO PERFORM SIGNAL ROUTING IN A SATELLITE COMMUNICATION SYSTEM

[75] Inventor: William Joe Haber, Tempe, Ariz.

[73] Assignee: Motorola, Inc., Schaumburg, Ill.

[21] Appl. No.: 08/905,756

[22] Filed: Aug. 4, 1997

[51] Int. Cl.[7] .......................... H04B 7/216; H04L 12/28; H04L 12/56
[52] U.S. Cl. .......................... 370/400; 370/335; 370/474
[58] Field of Search ....................... 370/320, 323, 370/325, 335, 351, 389, 400, 401, 342, 474, 441; 375/206

[56] References Cited

U.S. PATENT DOCUMENTS

| | | | |
|---|---|---|---|
| 4,933,930 | 6/1990 | Lien et al. | 370/441 |
| 5,210,770 | 5/1993 | Rice | 375/1 |
| 5,257,257 | 10/1993 | Chen et al. | 370/18 |
| 5,363,404 | 11/1994 | Kotzin et al. | 375/1 |
| 5,394,391 | 2/1995 | Chen et al. | 370/18 |
| 5,406,550 | 4/1995 | McTiffin | 370/335 |
| 5,438,565 | 8/1995 | Hemmady et al. | 370/60 |
| 5,729,548 | 3/1998 | Holender | 370/474 |
| 5,815,527 | 9/1998 | Erving et al. | 375/206 |
| 5,878,037 | 3/1999 | Sherman | 370/335 |
| 5,940,379 | 8/1999 | Startup et al. | 370/320 |

*Primary Examiner*—Hassan Kizou
*Assistant Examiner*—John Pezzlo
*Attorney, Agent, or Firm*—Walter W. Nielsen; James E. Klekotka

[57] ABSTRACT

Message information is sent from an origination node to a destination node through a number of route-processing nodes (300). Routing/processing codes are determined for the number of route-processing nodes (300), and a destination code is determined for the destination node. Signal routes from origination nodes to destination nodes are determined in terms of multi-level paths. Different codes are used to identify the different path levels. Data that is to be sent to a particular user located at a destination node is first spread using the destination code for that destination node. This spread spectrum signal is spread a second time using a first routing/processing code. In addition, the data can be spread a number of additional times using a number of routing/processing codes. Route-processing nodes (300) receive and partially decode signals. During the transmission of the spread data, decoding processes are performed, and the decoded data is routed based on the results of these decoding processes.

14 Claims, 4 Drawing Sheets

APPARATUS AND METHODS FOR USING CODING TO PERFORM SIGNAL ROUTING IN A SATELLITE COMMUNICATION SYSTEM

FIELD OF THE INVENTION

This invention relates generally to packet switched communication systems and, more particularly, to apparatus and methods for performing signal routing in a satellite communication system.

BACKGROUND OF THE INVENTION

Communication networks include a collection of resources that are employed to transport user information from origination nodes to destination nodes. The resources include switching nodes and communication links. In a packet switching network, user information takes the form of packetized digital data. The user information is carried in discrete individual packets, and each individual packet carries its own destination address along with at least a portion of the user information. Switching nodes evaluate the destination addresses to determine how to appropriately route the packets.

In a code division multiple access (CDMA) system, a number of users are superimposed over each other in the same frequency channel. These codes operate with multiple code symbols per user bit on each user and spread the energy for each user over a broader spectrum than would otherwise be required. The codes can be superimposed over each other as long as they are mutually orthogonal.

Unfortunately, conventional packet switching and other networks are operated in a relatively inefficient manner. Inefficiencies result when header information must be attached to data packets so that routing can be performed. This can lead to the consumption of system resources, such as communication links, to transport system routing information instead of user information. The portion of link bandwidth which is used to transport header information cannot be used to transport user information, and this results in an inefficient use of network resources.

While the problems associated with the inefficient use of network resources plague a wide variety of communication networks, they have more serious consequences in networks which rely on RF communication links.

There is also a significant need for apparatus and methods for providing more efficient processing of user information within a satellite communication system. In addition, there is a significant need for apparatus and methods for consuming less power on-board orbiting satellites by making relatively minor modifications to the satellites and terrestrial equipment.

BRIEF DESCRIPTION OF THE DRAWINGS

A more complete understanding of the present invention can be derived by referring to the detailed description and claims when considered in connection with the figures, wherein like reference numbers refer to similar items throughout the figures, and:

DETAILED DESCRIPTION OF A PREFERRED EMBODIMENT

The present invention provides the apparatus and methods for providing more efficient processing of user information within a satellite communication system. In addition, the present invention provides the apparatus and methods for consuming less power on-board orbiting satellites by making relatively minor modifications to the satellites and terrestrial equipment.

Figure 1:
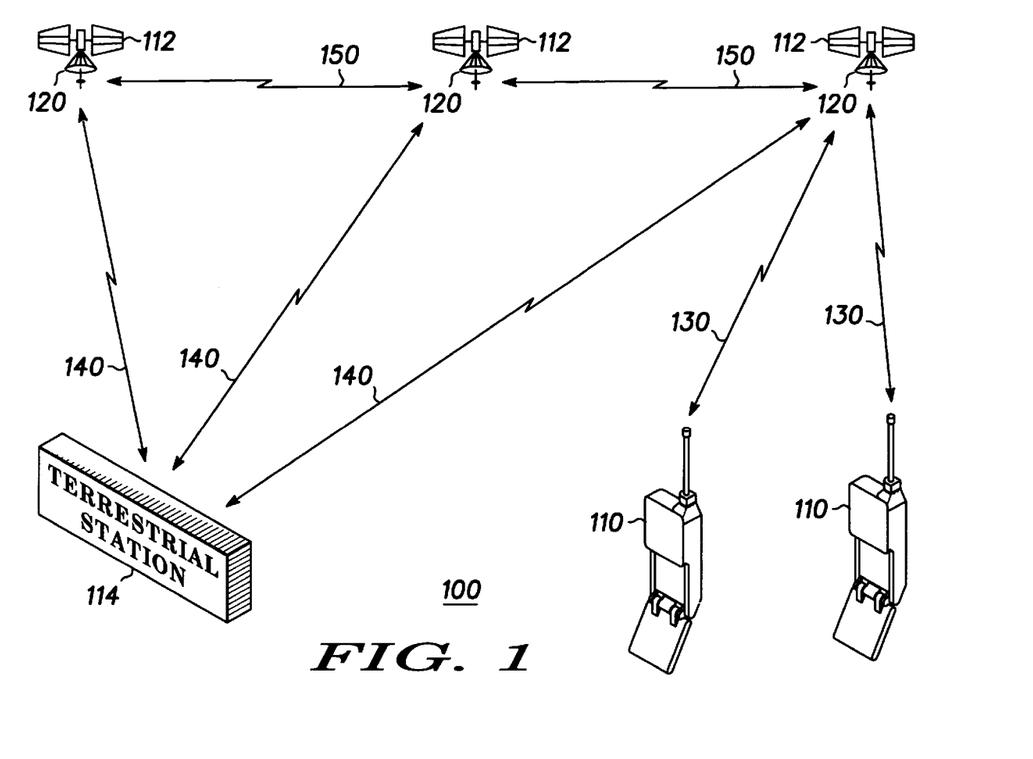
FIG. 1 shows a simplified block diagram of a satellite communication system within which the method and apparatus of the present invention can be practiced.

FIG. 1 shows a simplified block diagram of a satellite communication system within which the methods and apparatus of the present invention may be practiced. Satellite communication system 100 includes communication units 110, communication satellites 112 and terrestrial station 114. Communication units 110, communication satellites 112, and terrestrial stations 114 can be viewed as nodes in satellite communication system 100. Communication units 110 communicate with communication satellites 112 using radio frequency (RF) communication links 130. Terrestrial station 114 communicates with communication satellites 112 using earth links 140. Communication satellites 112 communicate with other communication satellites 112 using crosslinks 150.

Terrestrial station 114 can be a gateway and/or a control center. The numerous nodes in the communication system can be coupled together through the RF communication links. FIG. 1 depicts the nodes as being configured as communication units 110, communication satellites 112, and terrestrial station 114. Through the RF communication links, communication units 110, terrestrial station 114, and communication satellites 112 can communicate with other communication satellites, communication units, and terrestrial stations. The below-discussed features of a preferred embodiment of the present invention can be practiced at any node of satellite communication system 100 or any node of other communications systems.

Communication satellites 112 can reside in geostationary or non-geostationary orbits. In non-geostationary orbits, satellites 112 can move at high speed relative to any given point on the surface of the earth. Communication units 110 and terrestrial stations 114 can reside proximate to the surface of the earth and as such they are virtually stationary relative to satellites 112. Because of the relative movement between the communication satellites and communication units 110, the communication link is a temporary one, and hand-off schemes are employed to realize a continuous communication channel.

Communication satellites 112 are desirably configured as spread spectrum communications base stations and can be referred to as nodes below. Desirably, a communication unit in this communication system can communicate with the communication satellites visible to it at a particular time. For example, power monitoring may be done by communication units 110 to determine which communication satellites 112 are the best candidates for establishing a connection.

Antennas 120 on-board satellites 112 are configured to have multiple beams and to project cells (not shown) toward the surface of the earth. Communications with communication units 110 are conducted in accordance with channels assigned for use in the beams at any given instant.

User information exchanged between communication units is received at a communication satellite 112 via communication links 130. If the information is destined for a distant user, the information can be passed onward within the network of communication satellites using crosslinks 150 toward the ultimate destination. Such user information can be received from terrestrial station 114 along with other information, such as signaling and trunked information.

Generally, antennas 120 provide wideband signals each of which can convey numerous channels of information. In a preferred embodiment, the information is conveyed using spread spectrum techniques. The channels of information are combined together in the wideband signals using code division multiple access (CDMA) techniques.

Communication satellites 112 receive spread spectrum (wideband) signals via links (130, 140). Communication satellites 112 decode the wideband signals into narrower band signals, which convey less information and perform routing functions specified in the code. The decoding process routes the information in the signal to the proper downlink channel, and the satellite transmits the information on the downlink. Links 130, 140 and 150 support communication and signaling traffic in both directions.

The signals, which are decoded to be sent to a non-local destination node, are routed to different subsystems in communication satellite 112. These signals are generally routed using crosslinks 150.

Communication units 110 decode the information from the individual channel coded with their specific code. The individual channel which has been decoded by a particular communication unit is demodulated to obtain communicated information. Communication units 110 encode the information which they transmit with a user specific code.

Terrestrial stations 114, like communication units 110 and communication satellites 112, can modulate and demodulate the information after it has been received and partially decoded. Terrestrial stations 114, like communication units 110 and communication satellites 112, generate spread spectrum signals. Terrestrial stations 114 and some communication units can combine information from several different users into a wideband signal. The wideband signal is then transmitted over an uplink. Terrestrial stations 114 and some communication units can separate information that has been sent with other modulated data in a wideband signal. The wideband signal is one which has been received on an incoming portion of a link.

Figure 2:
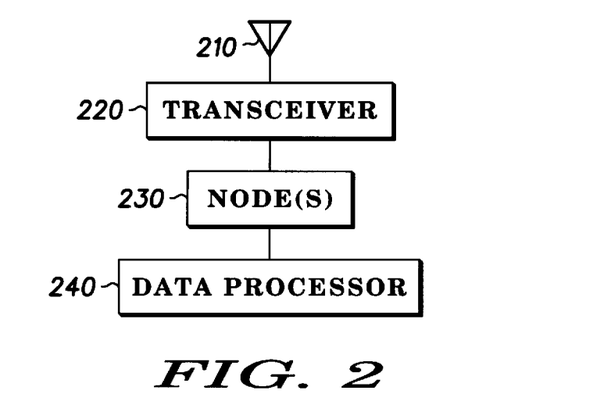
FIG. 2 shows a simplified block diagram of a communication device for use in accordance with a preferred embodiment of the present invention.

FIG. 2 shows a simplified block diagram of a communication device for use in accordance with a preferred embodiment of the present invention. Communication device 200 desirably comprises antenna subsystem 210, transceiver 220, one of more processing nodes 230, and at least one data processor 240. One antenna subsystem, one transceiver, one group of route-processing nodes, and one data processor are shown to simplify FIG. 2.

Those skilled in the art will recognize that although only one antenna subsystem is shown, antenna subsystem 210 can comprise many different antennas for many different purposes. For example, antennas are needed to support links to and from communication units, links to and from terrestrial stations and control centers, and links to and from communication satellites. Preferably, at least one antenna supports CDMA links to other communication devices.

Those skilled in the art will also recognize that although only one transceiver is shown, many are preferably located on each communication device. Again, by way of example, transceivers are needed to support links to and from communication units, links to and from terrestrial stations and control centers, and links to and from communication satellites. Preferably, at least one transceiver supports CDMA links to other communication devices.

Communication devices 200 can function as receiving devices, as transmitting devices, or as both a transmitting and a receiving device. In addition, processing nodes 230 perform decoding and/or encoding functions and, in this way, also provide routing functions.

Processing node(s) 230 are used to decode spread spectrum signals received by communication device 200. Processing node(s) 230 are also used to encode spread spectrum signals transmitted by communication device 200.

Data processor 240 is coupled to processing node(s) 230. Data processor 240 can be implemented using one or more processors. In an alternate embodiment, data processor 240 is also coupled to transceiver 220. Data processor 240 stores data that serve as its instructions and that, when executed by data processor 240, cause communication device 200 to carry out procedures which are discussed below.

Data processor 240 can provide management and control functions. Data processor 240 preferably also provides for the allocation of the frequency and time-slot assignments for links between communication devices 200.

Although the connections between components are illustrated as a single lines (paths), those skilled in the art will recognize that any of these single path can represent a parallel combination of paths.

Those skilled in the art will recognize that communication devices 200 can be communication units 110, communication satellites 112, and/or terrestrial stations 114, and communication devices 200 can be viewed as nodes in satellite communication system 100

Figure 3:
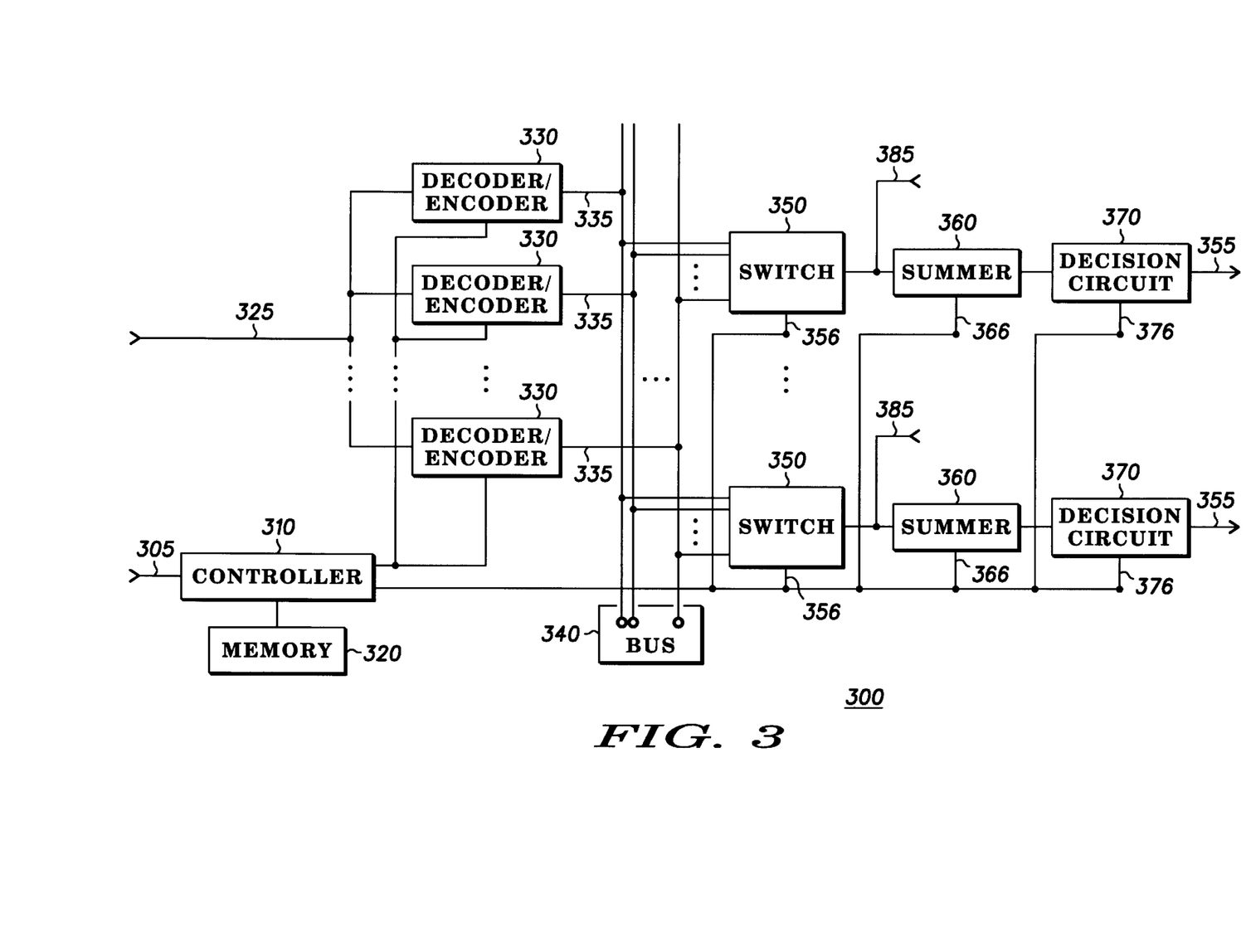
FIG. 3 shows a simplified block diagram of a route-processing node for use in a communication device in accordance with a preferred embodiment of the present invention.

FIG. 3 shows a simplified block diagram of a route-processing node for use in a communication device in accordance with a preferred embodiment of the present invention. Processing nodes 230 (FIG. 2) may be used as route-processing nodes 300. Route-processing node 300 desirably comprises controller 310, memory 320, a plurality of decoder/encoders 330, a bus 340, a plurality of switches 350, a plurality of summers 360, a plurality of decision circuits 370, at least one input port 325, at least one control port 305, at least one encode port 385, and at least one output port 355.

All decoder/encoders 330 are illustrated having their inputs connected to input port 325 on route-processing node 300. In an alternate embodiment, this set of connections may be replaced by a switch matrix. Although the connection between input port 325 and decoder/encoders 330 are illustrated as single paths, those skilled in the art will also recognize that these single paths can represent a parallel combination of paths.

Decoder/encoders 330 are illustrated with only one output 335. Those skilled in the art will recognize that this is not intended to limit the present invention. This output can encompass many paths to a variety of other components and/or subsystems. Each decoder/encoder output 335 is connected to at least one path 342 in bus 340. Bus 340 is used for, among other things, connecting the outputs 335 on decoder/encoders 330 to input connections 345 on switches 350.

Switches 350 are controlled via ports 356. Control signals received via port 356 cause switches 350 to connect to one of the plurality of summers 360. Summers 360 are used to accumulate the results from many decoding operations.

Controller 310 determines the number of decoder results to use before passing the accumulated results to decision circuit 370. The number of decoder results which are used is determined from the summation number. In a preferred embodiment, controller 310 determines the summation number.

Controller 310 controls the operation of decoder/encoders 330, switches 350, summers 360, and decision circuits 370. Summers 360 are controlled via ports 366. Decision circuits 370 are controlled via ports 376. Decision circuits 370 compare the accumulated results with a threshold value. If the accumulated results exceed the threshold, then the decision circuit outputs a "1". If the accumulated results do not exceed the threshold, then the decision circuit outputs a "0". In an alternate embodiment, switches 350 may be multiple-input/multiple-output devices. Those skilled in the art will recognize that bus 340 may not be necessary, and that its size may vary.

When data is sent to route-processing node 300, the data is received at input port 325. This data can be from one or more sources. The data is processed by sampling the input data stream. In a TDMA system, information is sent in a packetized format. Usually the minimum packet of information is contained in a timeslot, and a sample can comprise one or more timeslots.

In a preferred embodiment of the present invention, one timing group is used at a time in the decoding operation. Controller 310 is used to determine when timing boundaries occur. Controller 310 determines the number of symbols to send to each individual decoder/encoder 330 and which particular samples to put into each individual symbol buffer for each timing group. In a preferred embodiment, each individual decoder/encoder 330 contains a symbol (sampling) buffer.

In a preferred embodiment, memory 320 contains a number of buffers corresponding to spread code groups for each user being processed. In this case, a first buffer contains information for user one, and a last sample buffer contains the information for the last data user. Controller 310 determines which samples to store in which buffers.

Decoder/encoders 330 decode the input data using CDMA techniques. During each decoding cycle a unique processing (CDMA) code is supplied to each one of the decoder/encoders 330. The decoding operations are performed internal to decoder/encoders 330. The outputs obtained from a number of individual decoding operations are accumulated and compared against a reference level to determine if the signal is a "1" or a "0" in the downstream processing.

Processing operations in the route-processing node can be varied. Threshold levels can be changed. Data can be held in buffers and reprocessed. Different codes may be provided to decoder/encoders 330. Switch 350 states may be altered to change the input sequence into individual summers 360.

Route-processing node 300 can operate as a decoding node and/or an encoding node. As an encoding node, data flow is reversed. Data is supplied to the individual switches 350 using encode ports 385. A specific user code is used to spread the user information and the user code is selected by switch sequence enabling data to encoder 330. Outputs of encoders are summed at port 325.

Those skilled in the art will appreciate that many different structures can be useful in this processing system. Routes can be established with more than one route-processing node. In addition, nothing prevents the output signals of a route-processing node from being provided in parallel over a common communication path to more than one other route-processing node. In other embodiments, route-processing node 300 can be implemented, at least in part, using a digital signal processor.

In alternate embodiments, summation nodes can be used to combine decoded and encoded signals. These combined signals can be sent to other nodes for further processing.

Generally, user information is generated at an origination node. The user information is digitized and incorporated into a block structure which can include code structure for routing/processing purposes. The blocks are processed by the origination node and then transported to one or more intended receiving devices. The coded block comprises message (user) information and routing/processing code information. Receiving devices use these routing/processing codes to determine where to send their output data.

In a preferred embodiment, a number of route-processing nodes are placed on each Low Earth Orbit (LEO) satellite in the communication system. However, the present invention is applicable to systems including satellites having low-earth, medium-earth or high-earth orbits, or to systems including satellites at different altitudes. Additionally, it is applicable to orbits having any angle of inclination (e.g., polar, equatorial or other orbital pattern).

Route-processing node 300 can also be part of a communication satellite 112 (FIG. 1). Communication satellites communicate with terrestrial stations which can include some number of radio frequency (RF) communication units (CUs), gateways (GWs) and control centers. Communication satellites can be built to operate using FDMA, TDMA and/or CDMA communication techniques. Some communication satellites can be multi-modal which means that they can operate using one or more of these communication techniques.

Route-processing node 300 can be part of a terrestrial station 114 (FIG. 1) which can be a gateway or a control center. Route-processing node 300 can be part of a communication unit 110 (FIG. 1). Communication units and terrestrial stations can also be built to operate using Frequency Division Multiplex Access (FDMA), Time Division Multiple Access (TDMA), and/or CDMA communication techniques. In this case, some communication units and terrestrial stations are multi-modal which means that they can operate using one or more of the communication techniques. Communication units and terrestrial stations can communicate with more than one communication satellite at a time.

Communication units and terrestrial stations can be located anywhere on the surface of the earth or in the atmosphere above the earth. Communication units and terrestrial stations are preferably communications devices capable of transmitting voice and/or data to and receiving data from communication satellites using spread spectrum techniques. For example, communication units can be data terminals adapted to communicate with communication satellites. Communication units can also be facsimile devices, pagers, imaging system terminals, or any other type of communication devices adapted to transmit spread spectrum data to and/or receive spread spectrum data from communication satellites.

In a preferred embodiment, a route between an origination node and a destination node comprises two route-processing nodes. The route comprises a first segment from an origination node to a first route-processing node. The route also comprises a second segment from the first route-processing node to a second route-processing node. In addition, the route comprises a third segment from the second route-processing node to the destination node.

In a preferred embodiment, an origination node is used to encode each bit of message information into a first-level encoded signal using a destination code. The origination node also encodes the first-level encoded signal into a second-level encoded signal using a first routing/processing code. Then, the origination node encodes the second-level encoded signal into a third-level encoded signal using a second routing/processing code. Finally, the origination node sends the third-level encoded signal to a first route-processing node via a first segment.

In a preferred embodiment, the first route-processing node decodes the fourth-level encoded signal into a first-level decoded signal using the third routing/processing code. The third routing/processing code is used to determine a first path through the first route-processing node. The first path is used to connect the first segment and a second segment. The first route-processing node sends the first-level decoded signal to a second route-processing node via the second segment.

In a preferred embodiment, the second route-processing node decodes the first-level decoded signal into a second-level decoded signal using the second routing/processing code. The second routing/processing code is used to determine a path through the second route-processing node. The path connects the second segment and a third segment. The second route-processing node sends the second-level decoded signal to a destination node via the third segment.

In a preferred embodiment, the destination node decodes the second-level decoded signal into at least one bit of message information using the destination code.

Figure 4:
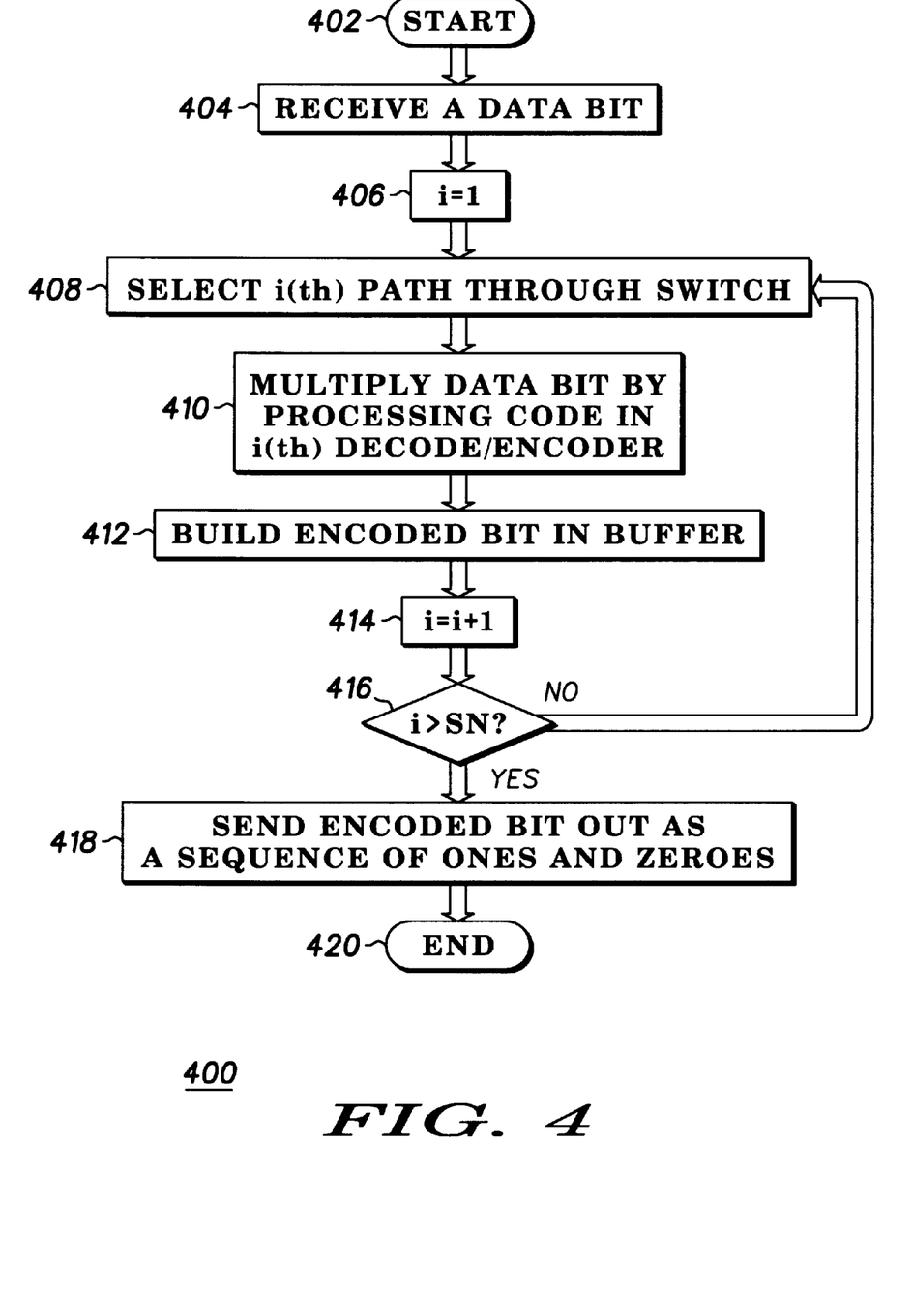
FIG. 4 shows a flow chart for a method of operating a route-processing node to encode data in accordance with a preferred embodiment of the present invention.

FIG. 4 shows a flow chart for a method of operating a route-processing node to encode data in accordance with a preferred embodiment of the present invention. Procedure 400 starts with step 402.

In step 404, the route-processing node receives a data bit. The data bit is smallest portion of message information. The data bit has a duration of T1 seconds. T1 is variable and is determined by the length of the bit being examined depending on where the processing takes place.

In step 406, a counting variable (i) is initialized. The counting variable is used to determine the number of symbols that will be used to encode each bit.

In step 408, the i(th) position on one of the switches is chosen based on switching code. This causes the data bit to be sent to the i(th) decoder/encoder.

In step 410, the data bit is multiplied by the processing code in the i(th) decoder/encoder. For example, the processing code could be "3". This means that 011 is sent to the decoder/encoder. Likewise, for a processing code of "7", a 111 pattern is sent to the decoder/encoder.

In step 412, the output of the multiplication buffered and sent on to sum with the results of other processing results.

In step 414, the counting variable is incremented by one.

In step 416, the counting variable is compared to the summation number. When the counting variable exceeds the summation number, the procedure 400 branches to step 418. When the counting variable does not exceed the summation number, the procedure 400 branches to step 408, and procedure 400 iterates as shown in FIG. 4.

In step 418, the route-processing node outputs the encoded bit as a sequence of "1s" and "0s". Procedure 400 continues to step 420 and ends.

The route-processing node encodes each symbol with a particular processing code. Each particular processing code represents a different sub-symbol pattern. The switching code is used to determine which processing code is used for each symbol. This is done by connecting a particular switch port to a particular decoder/encoder. In a preferred embodiment, SN1 is ten. In a preferred embodiment, each processing code has three sub-symbols. In a preferred embodiment, there are eight processing codes. The processing code has N1 sub-symbols. The number of possible processing codes is determined by using $2^{N1}$. The sub-symbols have two levels ("1" and "0"), and a sub-symbol is either a "1" or a "0". The symbols each have a duration of (T1/SN1) seconds. The sub-symbols each have a duration of (T1/(SN1*N1)) seconds.

For example, a sequence of symbols is 3 5 2 0 1 4 3 6 7 5. The switch in this case has to change positions. This sequence of symbols results in a sequence of sub-symbols 011101010000001100011110111101. Another sequence of symbols is 3 3 3 3 3 3 3 3 3 3. In this case, the switch position does not change.

In a preferred embodiment, the first route-processing node receives an input signal. The first route-processing node processes the input signal (an encoded signal) into a sequence of sub-sub-sub-symbols. In a preferred embodiment, the first route-processing node also receives a first processing code, a switching code, and a summation number (SN1). The first route-processing node groups N3 sub-sub-sub-symbols into a sub-sub-symbol. A sub-sub-sub-symbol has a duration of $t_p$ seconds, and the sub-sub-symbol has a duration of N3* $t_p$ seconds. In the first route-processing node, the sub-sub-symbol is sent to a number of decoders. The number of decoders is less than or equal to $2^{N3}$.

The sub-sub-symbol is multiplied by a number of codes using a number of decoders. The decoder outputs are connected to a number of switch inputs. The output from a particular decoder is used to provide an input signal for one of the summers.

The switch is used to select one decoder output to provide to a summer. The summer accumulates the results from a number of sub-sub-symbol decoding operations. In a preferred embodiment, this is a summation number (SN). In a preferred embodiment, the first summation number (SN1) establishes the number of sub-sub-symbol decoding operations used for each summing operation to be ten, that is SN1 equals ten.

In a preferred embodiment, there are eight decoders being used. The switch selects one of eight decoder outputs to be used as the input to the summer. The switching code determines the selection pattern. If the switch position remains constant for the entire sample period, then the summer accumulates ten (summation number) outputs from the same decoder.

The summer sums the ten decoder outputs provided to it by the switch. The summer sends an output to the decision circuit every ten sub-sub-symbols. In a preferred embodiment, this occurs every SN1* N3* $t_p$ seconds.

In a preferred embodiment, the decision circuit compares the output received from the summer with a known threshold value.

In an alternate embodiment, the decision circuit is only used once at the completion of the processing.

In a preferred embodiment, the decision circuit outputs an "A2" sub-sub-symbol when the threshold value is exceeded. The decision circuit outputs a "B2" sub-symbol when the threshold value is not exceeded. The output rate is every (10*N3* $t_p$) seconds. In this manner, a first-level decoded signal is created which comprises a sequence of "A2"

sub-sub-symbols and "B2" sub-sub-symbols. In a preferred embodiment, the "A2" sub-sub-symbol is a "1", and "B2" sub-sub-symbol is a "0".

In a preferred embodiment, the first route-processing node sends the first level decoded signal to a second route-processing node. In an alternate embodiment, the first route-processing node sends the first level decoded signal to a destination node.

In a preferred embodiment, the second route-processing node receives an input signal. The second route-processing node receives and processes the input signal (a first-level decoded signal) into a sequence of sub-sub-symbols. In a preferred embodiment, the second route-processing node also receives a second processing code and a second switching code. The second route-processing node groups N2 sub-sub-symbols into a sub-symbol. A sub-sub-symbol has a duration of $N1*t_p$ seconds, and the sub-symbol has a duration of $N2*SN1*N1*t_p$ seconds. In the second route-processing node, the sub-symbol is sent to a number of decoders. The number of decoders is less than or equal to $2^{\wedge}N2$.

The sub-symbol is multiplied by a number of codes using a number of decoders. The sub-symbol is multiplied with all of the second set of processing codes in the decoders. A second processing code comprises N2 sub-sub-symbols. The outputs on these particular decoders are used to provide input signals to a plurality of switches.

One switch is used to select one decoder output to provide to a summer for a particular period of time. The summer accumulates the results from a number of sub-symbol decoding operations. In a preferred embodiment, this is a summation number (SN). In a preferred embodiment, the second summation number (SN2) establishes the number of sub-symbol decoding operations used for each summing operation to be ten, that is SN2 equals ten.

In a preferred embodiment, there are eight decoders being used in the second route-processing node. A switch in the second route-processing node selects one of eight decoder outputs to be used as the input to the summer. The switching code (SN2) determines the selection pattern for the second route-processing node. When the switch position remains constant for the entire sample period, then the summer accumulates ten (summation number) outputs from the same decoder.

The switch code may change every sub-symbol period. For example, when the summation number is ten, the switch code for a ten sub-symbol sample could be 5,3,2,4,5,7,0,1,7,6. In this case, the switch selects the output from decoder "5" for the first sub-symbol interval and the output from decoder "3" for the second sub-symbol interval. In this case, the switch selects the output from decoder "2" for the third sub-symbol interval and the output from decoder "4" for the fourth sub-symbol interval. The switch selects the output from decoder "5" for the fifth sub-symbol interval and the output from decoder "7" for the sixth sub-symbol interval. The switch selects the output from decoder "0" for the seventh sub-symbol interval and the output from decoder "1" for the eighth sub-symbol interval. The switch selects the output from decoder "7" for the ninth sub-symbol interval and the output from decoder "6" for the tenth sub-symbol interval.

The summer sums the ten decoder outputs provided to it by the switch. The summer sends an output to the decision circuit every SN2 (ten) sub-symbols. In a preferred embodiment, this occurs every SN2* N2*SN1*N1* $t_p$ seconds.

In a preferred embodiment, the decision circuit compares the output received from the summer with a known threshold value.

In a preferred embodiment, the decision circuit outputs an "A1" sub-sub-symbol when the threshold value is exceeded. The decision circuit outputs a "B1" sub-symbol when the threshold value is not exceeded. The output rate is every $SN2*N2*SN1*N1*t_p$ seconds. In this manner, a second-level decoded signal is created which comprises a sequence of "A1" sub-symbols and "B1" sub-symbols.

In a preferred embodiment, the second route-processing node sends the second-level decoded signal to a destination node. In an alternate embodiment, the second route-processing node sends the second-level decoded signal to another route-processing node.

In a preferred embodiment, the destination node receives an input signal. The destination node processes the input signal (a second-level decoded signal) into a sequence of sub-symbols. In a preferred embodiment, the destination node also receives a destination code, a switching code, and a summation number (SN). The destination node groups N sub-symbols into a symbol and SN symbols into a bit of message information. A symbol has a duration of $N*SN1*N1*SN2*N2*t_p$ seconds, and the bit has a duration of $SN*N*SN1*N1*SN2*N2*t_p$ seconds. In the destination node, the bit is sent to a number of decoders. The number of decoders is less than or equal to $2^{\wedge}N$.

The symbol is multiplied by a number of codes using a number of decoders. The symbol is multiplied by all of the second processing codes in the decoders. The destination code has N sub-symbols. The outputs on these particular decoders are used to provide input signals to a plurality of switches.

One switch is used to select one decoder output to provide to a summer for a particular period of time. The summer accumulates the results from a number of sub-symbol decoding operations. In a preferred embodiment, this is a summation number (SN). In a preferred embodiment, the third summation number (SN3) establishes the number of sub-symbol decoding operations used for each summing operation to be ten, that is SN3 equals ten.

In a preferred embodiment, there are eight decoders being used in the destination node. A switch, in the destination node, selects one-of-eight decoder outputs to be used as the input to the summer. The switching code (SN3) determines the selection pattern for the destination node. When the switch position remains constant for the entire sample period, then the summer accumulates ten (summation number) outputs from the same decoder.

The switch code may change every symbol period. For example, when the summation number is ten, the switch code for a ten symbol sample could be 5,6,4,6,3,6,2,6,1,6. In this case, the switch selects the output from decoder "5" for the first symbol interval and the output from decoder "6" for the second symbol interval. In this case, the switch selects the output from decoder "4" for the third symbol interval and the output from decoder "6" for the fourth symbol interval. The switch selects the output from decoder "3" for the fifth symbol interval and the output from decoder "6" for the sixth symbol interval. The switch selects the output from decoder "2" for the seventh symbol interval and the output from decoder "6" for the eighth symbol interval. The switch selects the output from decoder "1" for the ninth symbol interval and the output from decoder "6" for the tenth symbol interval.

The summer, in the destination node, sums the ten decoder outputs provided to it by the switch. The summer sends an output to the decision circuit, in the destination node, every SN3 (ten) symbols. In a preferred embodiment, this occurs every SN*N*SN1* N1*SN2*N2* $t_p$ seconds.

In a preferred embodiment, the decision circuit compares the output received from the summer with a known threshold value.

In a preferred embodiment, the decision circuit outputs a level-one bit when the threshold value is exceeded. The decision circuit outputs a level-two bit when the threshold value is not exceeded. The output rate is every SN*N*SN1* N1*SN2*N2* $t_p$ seconds. In this manner, a message information signal is created which comprises a sequence of level-one bits and level-two bits.

When a route-processing node is connected to the last segment in the route, then the route-processing node sends its output signal to a destination node. When the route-processing node is not connected to the last segment in the route, then the route-processing node sends its output signal to another route-processing node.

Figure 5:
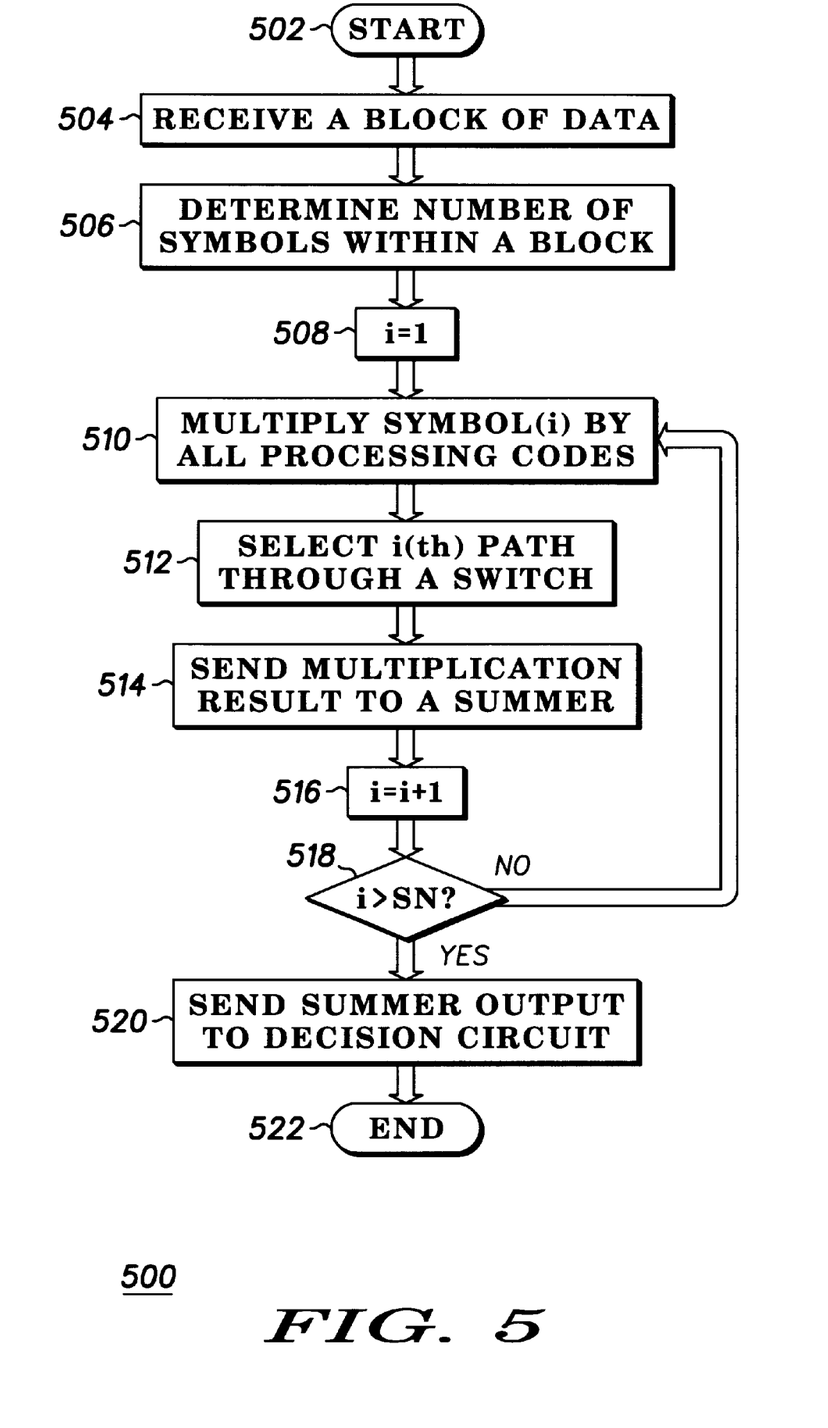
FIG. 5 shows a flow chart for a method of operating a route-processing node to decode data in accordance with a preferred embodiment of the present invention.

FIG. 5 shows a flow chart for a method of operating a route-processing node to decode data in accordance with a preferred embodiment of the present invention. Procedure 500 starts with step 502. The starting of procedure 500 could be the result of a user at an origination node sending message information to a route-processing node.

In a preferred embodiment, the route-processing node has at least one input port and at least one output port. Those skilled in the art will also recognize that route-processing nodes may be connected to other route-processing nodes, to origination nodes, and/or to destination nodes. Those skilled in the art will also recognize that route-processing nodes may function as origination nodes and/or destination nodes.

In step 504, the route-processing node receives a block of data. In a preferred embodiment the block of data is encoded message information. The block of data comprises a sequence of pulses and each pulse is $t_p$ seconds in duration. These pulses are are the sum of one or more encoded data streams and may also include noise. The route-processing node also receives a summation number, a switching code, and a number of processing codes.

In step 506, the sequence of pulses is sampled to produce a number of symbols. The number of symbols within a block is variable and is determined by the summation number. In a preferred embodiment, there are ten symbols in a block. The number of data pulses in a symbol is also variable, and this number is determined by the number (N) of pulses (sub-symbols) in the processing code. In a preferred embodiment, there are three data pulses in a symbol.

In step 508, a counting variable (i) is initialized.

In step 508, the i(th) symbol is sent to all of the decoders at the same time. In a preferred embodiment, all of the decoders have at least one input, and all of the inputs are connected to the input port on the route-processing node. In a preferred embodiment, each decoder has a data buffer in which the block of data pulses is temporarily stored. The data buffers allow individual symbols to be sent to the decoder/encoders.

In step 510, all processing codes are sent to all of the decoders. In a preferred embodiment, a different processing code is sent to each of the decoders. The processing code is the same length as the symbol. In a preferred embodiment, each decoder has a code input for receiving a processing code. Each decoder has a code buffer in which the processing code is temporarily stored. Each of the decoder/encoder multiplies the symbol it receives by the processing code which was sent to it. In alternate embodiments, the same processing code is sent to more than one decoder in order to perform error correction.

In step 512, a switching code is examined to determine which decoder output is to be selected by a particular switch at this particular time. The switches are controlled by the switching codes. The i(th) path through the switch is selected. This connects the i(th) decoder/encoder output to a summer. In a preferred embodiment, the first three pulses are multiplied by a first processing code in the first decoder. Also, the first three pulses are multiplied by a second processing code in the second decoder. This continues until the block of data pulses is multiplied by the last processing code in the last decoder. In a preferred embodiment, there are eight decoders each with a unique three bit code pattern selected. In other words, the first three pulses are multiplied by the N(th) processing code in the N(th) decoder.

This operation is performed for each one of the switches. In this manner, each switch selects an output from one decoder to provide to a summer. In a preferred embodiment, one switch output is connected to one summer input.

In step 514, a decoder/encoder output is sent to a summer.
In step 516, the counting variable is incremented.

In step 518, a query is performed to determine if enough symbols have been summed. The number of symbols which must be summed before a decision can be made is established by the summation number. This number is provided to the route-processing node by the system. In alternate embodiments, the route-processing node determines the summation number.

When more symbols are required, then procedure 500 branches to step 510. When more symbols are not required, then procedure 500 branches to step 520.

In step 520, the summer output is provided to the decision circuit. The decision circuit determines if the summer output exceeds a threshold value. In a preferred embodiment, the decision circuit's output goes to a "1" which is the "true" state when the threshold is exceeded. One or more decoder outputs may go to a "1" during a particular sampling period. If at least one decoder output does not go to a "1" during a particular sampling period, then error correction procedures are performed. The decision circuit's output goes to a "0" which is the "false" state when the threshold is not exceeded. Procedure 500 continues to step 522 and ends.

The switching code is used to determine which decoder output is selected. In a preferred embodiment, the decoder output is selected from the decoder that is expected to provide the maximum output for this particular sampling time. For example, assume that the code pattern is "101". In this case, the decoder output for this decoder is a maximum when the block of data pulses is also "101". The decoder output for this decoder is less than maximum when the block of data pulses is any other pattern such as "010".

In a preferred embodiment, a plurality of switches are included in the route-processing node. These switches are N:1 switches, and each one of the N inputs is connected to a decoder output. Each switch output is connected to a summer; each summer is connected to a decision circuit; and each decision circuit is connect to an output port on the route-processing node.

The state of the switch is controlled such that a single path is established between the switch output and one of the N switch inputs. In this case, the switch changes state at the symbol rate. In an alternate embodiment, the switch operates at a bit rate.

When a user at an origination node wants to send message information to another user at a destination node, a communication route is established. In one case, a spread spectrum user is trying to contact another spread spectrum user. Both users are part of a global communication system that provides spread spectrum communication services to some of its customers.

Spread spectrum communication links can be established for any or all segments in the route between an origination node and a destination node. In a preferred embodiment, a one-way message transfer is assumed. Those skilled in the art will recognize that origination nodes can become destination nodes, and destination nodes can become origination nodes based on the direction of flow for the messages. In this case, a code which identifies a particular user could be used either as an origination code or a destination code.

For this example, the calling party is identified as the user at the origination node, and the called party is identified as the user at the destination node. In a two-way call, when the called party responds back to the calling party, the called party is identified as the user at the origination node, and the calling party is identified as the user at the destination node.

The user code and location for the called party are determined. In this case, the user code for the called party is the destination code. In this example, the origination node, which could be a subscriber unit or a terrestrial station, uses the destination code to spread the message information. The user code for the called party and the location are determined using various protocols known to those skilled in the art. For example, the calling party can send a set of dialed digits in one or more access messages, and this information could be used to determine the user code and/or location for the called party.

Also, by way of example, the destination node (called party) either knows its user code or it can be sent a user code in one or more messages. In addition, the location for the destination node could be determined from a geo-location device, or from an access beam algorithm, or be sent to the called party, in one or more messages. In some cases, the called party's location could be determined from a memory device.

The route can also include a number of route-processing nodes. In a preferred embodiment, the route comprises an origination node, two route-processing nodes, and a destination node. Also, the route comprises a number of segments and a number of paths.

The segments illustrate "connections between nodes". For example, a wire could be used to establish a connection between two nodes. An RF or optical beam could also be used to establish a connection between two nodes. In a preferred embodiment, a first segment is used to connect the origination node to the first route-processing node. A second segment is used to connect the first route-processing node to the second route-processing node. A third segment is used to connect the second route-processing node to the destination node.

The paths illustrate "connections between segments". In a preferred embodiment, a first-level path is required through the first route-processing node to connect the first segment to the second segment. In addition, a second-level path is required through the second route-processing node to connect the second segment to the third segment.

Routing/processing codes for the route-processing nodes in the route are determined. These codes are necessary to establish the first-level and the second-level paths.

In this case, the origination node, which could be a subscriber unit or a terrestrial station, uses the code for the first route-processing node to spread the message information. The origination node can separately perform spreading operations for the destination node coding and the route-processing node coding, or the origination node can combine the coding. Origination nodes can separately perform spreading operations for the destination node coding and the route-processing node coding, or the origination node can combine the coding.

In a preferred embodiment, the origination node first uses the destination code to spread the message information into a spread spectrum signal. Secondly, the origination node uses a number of routing/processing codes in a specific sequence to further spread the signal's spectrum. In a preferred embodiment, the origination node transmits a spread spectrum signal. The origination node transmits a spread spectrum signal to the satellite currently serving it. In this case, the first segment is the RF beam transmitted from the origination node which could be a subscriber unit or terrestrial station.

The routing/processing codes are used by the route-processing nodes to partially decode the spread spectrum signal, and the switching codes are used to perform a routing function. In a preferred embodiment, the routing/processing codes are three-bit codes which are provided to particular decoders. Each decoder along with its three-bit code establishes a resultant multiplier output. The resultant multiplier output is dependent on the amount of correlation that exists between the code pattern and the block of data pulses. The multiplier outputs are connection to a plurality of switches.

The combination of the code length and the summation number causes a rate reduction to occur. For a three-bit code and a summation number equal to ten, the rate reduction is thirty-to-one. That is, for every thirty pulses in there is only one bit out. In the encoding process, a rate increase occurs.

In a preferred embodiment, there are two intermediary route-processing nodes. Alternate embodiments have been considered with one intermediary route-processing nodes and with three intermediary route-processing nodes. The processing gain restricts the number of route-processing nodes which can be used effectively.

The destination node receives and decodes the spread spectrum signal into message information using the destination code for this particular node. In a preferred embodiment, the signals received by the destination node are still spread spectrum signals, but the coding used for routing is no longer present. The amount of spectrum spreading is now dependent only on the destination code. In a preferred embodiment, the destination node is a spread spectrum device. For example, the spread spectrum device can be a terrestrial-based node such as a terrestrial station or a communication unit.

In a preferred embodiment of the present invention, a terrestrial station can be used as an origination node, a destination node, or a number of route30 processing nodes. The outputs from these route-processing nodes may be coupled to specific services provided by this particular terrestrial station. For example, one or more route-processing nodes can be used to provide information to the PSTN.

When the communication system receives a request to establish a spread spectrum communication channel from a user, then the communication system determines if communication channel can be established. Communication channels will not be established when resources are not available or are overloaded. Communication channels are also not established if the user does not have access privileges. The nodes communicate with each other and the system to establish communication parameters and access privileges. The nodes have knowledge about the data formatting rules used to establish the communication channel. Message queues and buffers are established to ensure that information messages are not lost if the links are heavily loaded.

A communication satellite which has been adapted to include one or more route-processing nodes can be use to route signals in a spread spectrum communication system and could be used to provide additional resources in the satellite communication system. No unique links are provided between the satellites. To support global connectivity, the modified satellites could replace existing satellites in the constellation.

The method and apparatus of the present invention enable the capabilities of a spread spectrum communication system to be greatly enhanced through the use of route-processing nodes. Using codes to carry routing information can be optimized for various missions, and additional cost benefits can be accrued by the system using the method and apparatus of the present invention.

The present invention has been described above with reference to a preferred embodiment. However, those skilled in the art will recognize that changes and modifications can be made in this embodiment without departing from the scope of the present invention. For example, while a preferred embodiment has been described in terms of using a specific number of route-processing nodes to decode and route message information, other systems can be envisioned which use different numbers of route-processing nodes. Accordingly, these and other changes and modifications which are obvious to those skilled in the art are intended to be included within the scope of the present invention.

What is claimed is:

1. In a communication system adapted to use routing/processing codes and switching codes to send message information along a route from an origination node through a plurality of route-processing nodes to a destination node, a method for operating said origination node, said method comprising the steps of:
   (a) receiving an input signal comprising a plurality of bits of message information;
   (b) receiving a destination code, a set of route-processing codes, and a plurality of switching codes;
   (c) encoding a first bit of said plurality of bits of message information into a first-level encoded signal using said destination code, said destination code having a first number (N) of symbols; and
   (d) encoding said first-level encoded signal into a second-level encoded signal using a first route-processing code, said first route-processing code determining a path from a first segment to a second segment of said route, wherein said first route-processing code encodes each symbol of said first-level encoded signal into a second number (N1) of sub-symbols, whereby said first-level encoded signal comprises a sequence of N symbols and said second-level encoded signal comprises a sequence of N*N1 sub-symbols.

2. The method as claimed in claim 1, wherein said method further comprises the step of:
   (e) sending said second-level encoded signal to a first route-processing node via said first segment.

3. The method as claimed in claim 2, wherein step (e) further comprises the step of:
   sending said second-level encoded signal by at least one optical means.

4. The method as claimed in claim 2, wherein step (e) further comprises the step of:
   sending said second-level encoded signal via at least one RF channel between a terrestrial-based communication device and a space-based communication device, wherein said at least one RF channel comprises a CDMA communications channel.

5. The method as claimed in claim 2, wherein step (e) further comprises the step of:
   sending said second-level encoded signal via at least one RF channel between a first terrestrial-based communication device and a second terrestrial-based communication device, wherein said at least one RF channel comprises a CDMA communications channel.

6. The method as claimed in claim 2, wherein step (e) further comprises the step of:
   sending said second-level encoded signal via at least one RF channel between a first space-based communication device and a second space-based communication device, wherein said at least one RF channel comprises a CDMA communications channel.

7. The method as claimed in claim 1, wherein said method further comprises the steps of:
   (e) encoding said second-level encoded signal into a third-level encoded signal using a second route-processing code, said second route-processing code determining a path from said second segment to a third segment of said route, wherein said second route-processing code encodes each sub-symbol of said second-level encoded signal into a third number (N2) of sub-sub-symbols, whereby said third-level encoded signal comprises a sequence of N*N1*N2 sub-sub-symbols.

8. The method as claimed in claim 7, wherein said method further comprises the step of:
   (f) sending said third-level encoded signal to said first route-processing node via said first segment.

9. The method as claimed in claim 1, wherein step (c) further comprises the steps of:
   (c1) examining said first bit in said plurality of bits, said bit having a duration of $t_p$ seconds and said bit being either a "1" or a "0"; and
   (c2) encoding said first bit with a first destination code when said first bit is a "1" and encoding said first bit with a second destination code when said first bit is a "0".

10. The method as claimed in claim 9, wherein said first destination code and said second destination code have the same number of symbols.

11. The method as claimed in claim 7, wherein said method further comprises the steps of:
   (f) encoding said third-level encoded signal into a fourth-level encoded signal using a third route-processing code, said third route-processing code for determining a path from said third segment to a fourth segment, wherein said third route-processing code encodes each sub-sub-symbol of said third-level encoded signal into a fourth number (N3) of sub-sub-sub-symbols, whereby said fourth-level encoded signal comprises a sequence of N*N1*N2*N3 sub-sub-sub-symbols; and
   (g) sending said fourth-level encoded signal to a first route-processing node via said first segment.

12. The method as claimed in claim 1, wherein said method further comprises the steps of:
   (e) encoding said second-level encoded signal into a third-level encoded signal using a second route-processing code, said second route-processing code determining a path from said second segment to a third segment of said route, wherein said second route-processing code encodes each sub-symbol of said second-level encoded signal into a third number (N2) of sub-sub-symbols, whereby said third-level encoded signal comprises a sequence of N*N1*N2 sub-sub-symbols;

(f) encoding said third-level encoded signal into a fourth-level encoded signal using a third route-processing code, said third route-processing code determining a path from said third segment to a fourth segment, wherein said third route-processing code encodes each sub-sub-symbol of said third-level encoded signal into a fourth number (N3) of sub-sub-sub-symbols, whereby said fourth-level encoded signal comprises a sequence of N*N1*N2*N3 sub-sub-sub-symbols; and (g) sending said fourth-level encoded signal to a first route-processing node via a first segment.

13. In a communication system, adapted to use routing codes to send message information along a route from an origination node through a plurality of route-processing nodes to a destination node, a method for operating a route-processing node, said method comprising the steps of:

(a) receiving at least one input signal;

(b) receiving a set of route-processing codes, a switching code, and a summation number;

(c) processing said at least one input signal into a block of data comprising a sequence of pulses;

(d) grouping a first number of said pulses into a symbol, a pulse having a duration of $t_p$ seconds, and said symbol having a duration of (said first number)* $t_p$ seconds;

(e) sending said symbol to a set of decoders in said route-processing node, wherein said set comprises (said first number)^N1 decoders;

(f) sending said set of route-processing codes to said set of decoders;

(g) obtaining a second number of decoder outputs by multiplying said symbol by said set of route-processing codes in said set of decoders;

(h) sending said second number of decoder outputs to a plurality of summers;

(i) repeating steps (d)–(h) a third number of times, wherein said third number is the number of said symbols in said block of data;

(j) sending an output from one of said plurality of summers to one of a plurality of decision circuits;

(k) comparing said output to a threshold;

(l) outputting a "1" as a portion of a decoded signal when said output exceeds said threshold; and (m) outputting a "0" as said portion of said decoded signal when said output does not exceed said threshold.

14. The method as claimed in claim 13, wherein said method further comprises the step of:

(n) sending said first-level decoded signal to said destination node via a last segment of said route.

* * * * *